United States Patent
Panchula et al.

(10) Patent No.: US 12,168,829 B2
(45) Date of Patent: Dec. 17, 2024

(54) ELECTROLYZER CONTROL

(71) Applicant: ELECTRIC HYDROGEN CO., Natick, MA (US)

(72) Inventors: Alex Panchula, Hillsborough, CA (US); David Eaglesham, Lexington, MA (US); Peter Matthews, South San Francisco, CA (US)

(73) Assignee: Electric Hydrogen Co., Natick, MA (US)

( * ) Notice: Subject to any disclaimer, the term of this patent is extended or adjusted under 35 U.S.C. 154(b) by 0 days.

(21) Appl. No.: 18/691,593

(22) PCT Filed: Nov. 23, 2022

(86) PCT No.: PCT/US2022/050939
§ 371 (c)(1),
(2) Date: Mar. 13, 2024

(87) PCT Pub. No.: WO2023/097028
PCT Pub. Date: Jun. 1, 2023

(65) Prior Publication Data
US 2024/0263330 A1    Aug. 8, 2024

Related U.S. Application Data

(60) Provisional application No. 63/283,043, filed on Nov. 24, 2021.

(51) Int. Cl.
C25B 15/02    (2021.01)
C25B 1/04    (2021.01)
(Continued)

(52) U.S. Cl.
CPC ............... C25B 15/02 (2013.01); C25B 9/70 (2021.01); C25B 9/73 (2021.01); C25B 15/023 (2021.01); C25B 1/04 (2013.01)

(58) Field of Classification Search
CPC ............................ C25B 15/02; C25B 15/023
See application file for complete search history.

(56) References Cited

U.S. PATENT DOCUMENTS

2015/0318567 A1    11/2015    Darling et al.
2018/0347406 A1    12/2018    Friesth
(Continued)

FOREIGN PATENT DOCUMENTS

WO    WO-2021228770 A1 *    11/2021    ............... C25B 1/04

OTHER PUBLICATIONS

Written Opinion of the International Searching Authority for PCT/US2022/050939, mailed Feb. 28, 2023, pp. 1-12.

Primary Examiner — Brian W Cohen
(74) Attorney, Agent, or Firm — Lempia Summerfield Katz LLC

(57) ABSTRACT

An electrolyzer system includes a multiple-state power input and control circuitry for the multiple-state power input. The control circuitry is configured to obtain a power source metric indicator and, based on the power source metric indicator, determine a hydrogen generation profile for the electrolyzer. The control circuitry is configured to determine, based on the hydrogen generation profile, a selected state from among multiple power states of the electrolyzer system. The control circuitry is configured to cause operation of the electrolyzer system in the selected state.

18 Claims, 6 Drawing Sheets

(51) Int. Cl.
*C25B 9/70* (2021.01)
*C25B 9/73* (2021.01)
*C25B 15/023* (2021.01)

(56) References Cited

U.S. PATENT DOCUMENTS

| | | |
|---|---|---|
| 2019/0194816 A1 | 6/2019 | Brunot et al. |
| 2019/0249319 A1 | 8/2019 | Joos et al. |
| 2019/0360110 A1* | 11/2019 | Mohri .................. F25B 47/006 |
| 2020/0263310 A1* | 8/2020 | Ua Cearnaigh ........... C25B 1/26 |
| 2021/0156039 A1 | 5/2021 | Ballantine et al. |
| 2023/0045707 A1* | 2/2023 | Unru ........................ C25B 9/65 |

* cited by examiner

ELECTROLYZER CONTROL

PRIORITY

This application is a § 371 nationalization of PCT Application Serial No. PCT/US2022/050939, filed Nov. 23, 2022, designating the United States, which claims priority to U.S. Provisional Application No. 63/283,043, filed Nov. 24, 2021, and titled ELECTROLYZER CONTROL, which are incorporated by reference herein in their entireties.

BACKGROUND

Technical Field

The disclosure relates generally to electrolyzer system control.

Brief Description of Related Technology

Electrolyzer systems use electrical energy to drive a chemical reaction. For example, water is split to form hydrogen and oxygen. The products may be used as energy sources for later use. In recent years, improvements in operational efficiency have made electrolyzer systems competitive market solutions for energy storage, generation, and/or transport. For example, the cost of generation may be below $10 per kilogram of hydrogen in some cases. Increases in efficiency and/or improvements in operation will continue to drive installation of electrolyzer systems.

DETAILED DESCRIPTION

Figure 1:
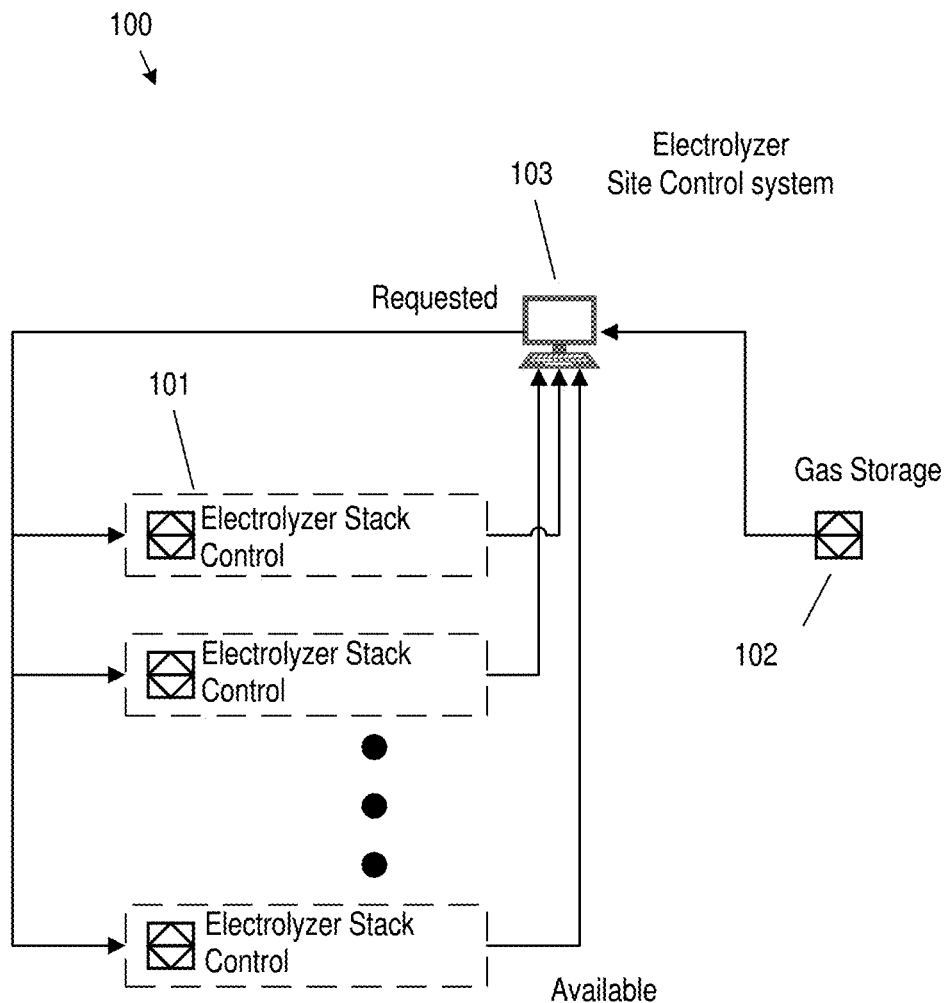
FIG. 1 shows an example electrolyzer control system.

The discussed architectures and techniques may support large-scale (and/or other scale) electrolyzer systems directly and/or virtually connected to renewable generation energy source, electrolysis systems providing grid services, control of the electrolysis systems with forecasting of renewable generation, and control of electrolyzer systems with market signals.

In some cases, renewable energy sources, which may be used to power an electrolyzer system, can be intermittent. For example, a solar generation system may produce little or no real power at night and power fluctuate continuously during the day due to atmospheric changes. Accordingly, the techniques and architectures discussed herein may provide real-time control of electrolyzer power usage.

Electrolyzer systems may include one or more electrolyzer stacks. Each stack may be independently connected to power electronics, water, and gas systems. In some cases, a subgroup of electrolyzer stacks may be coupled together for parallel control. Each stack and/or sub-group can be controlled independently with an electrolyzer stack controller.

Transitioning from a low-power standby state to a stable active state can take multiple minutes, depending on the technology of the electrolyzer system. Some of the time to achieve stability may be due, at least in part, to time constants of thermal effects within the electrolyzer systems.

An electrolyzer system may appear as a load to a power grid, such as that run by a power utility. In some cases, the electrolyzer system may react to the grid to improve stability. For example, the power electronics used to control the electrolyzer system can provide additional grid stabilizing services to the electrical grid by reacting to the frequency or voltage state on the grid. Therefore, in some cases, the system may support real-time and/or near-real-time reaction to the varying constraints of the grid and to the varying availability of the renewable energy. In some implementations, the electrolyzer may be co-located with one or more of its corresponding power sources and at least some of the information used in electrolyzer control may be generated from local control systems. Accordingly, the techniques and architectures discussed herein may be used to control electrolyzer systems.

Also, it is desired that the electrolyzer system can be controlled with economic signals and therefore the entire system of electrolyzer, renewable generation and grid can be controlled in real time as prices change.

Also, it is desired that the electrolyzer system be controlled differently depending on the electrolyzer State of Health. As an electrolyzer ages, its operating voltage at a given current will increase, which changes the economically optimum operating condition at a given grid state. In addition, the rate of degradation of the electrolyzer increases with frequent rapid transitions in current. Both the durability and the safety of the system may be affected by gas cross-over where H2 diffuses across the membrane to the O2 side. Thus, operation of the system may make use of detailed knowledge of the state of health of the electrolyzer, including (but not limited to) its age, voltage-at-operating-current, cell-to-cell voltage distribution, and gas cross-over, all of which may be monitored in real time.

Therefore, there remains a desire to control an electrolyzer system in real-time, with the capability to prepare the system for active control, provide grid services with power electronics, and react to data feeds or other signals, e.g. carrying economic data.

In various implementations, an electrolyzer system is directly connected to one or more renewable generation sources. In various implementations, an electrolyzer system is virtually connected to one or more renewable generation sources. In various implementations, an electrolyzer system is provided with real-time grid sensing of voltage and frequency. In various implementations, an electrolyzer system is provided with a forecast of renewable power generation. In various implementations, an electrolyzer system is connected to one or more renewable generation sources, that are also able to provide energy to the grid on demand. In various implementations, an electrolyzer system is provided with pricing data of energy. In various implementations, an electrolyzer system is provided with pricing data of gas. In various implementations, an electrolyzer system is connected to a hydrogen storage system.

FIG. 1 shows an example electrolyzer control system 100. A site controller 103 may be connected to one or more electrolyzer stack control systems 101. The site controller may be responsible for site level control of calculating the site power operating setpoint and distributing a requested power to the electrolyzer stack control systems. Additional site-level control, such as controls of gas storage 102, may also be sent to the electrolyzer site control system 101.

Figure 2:
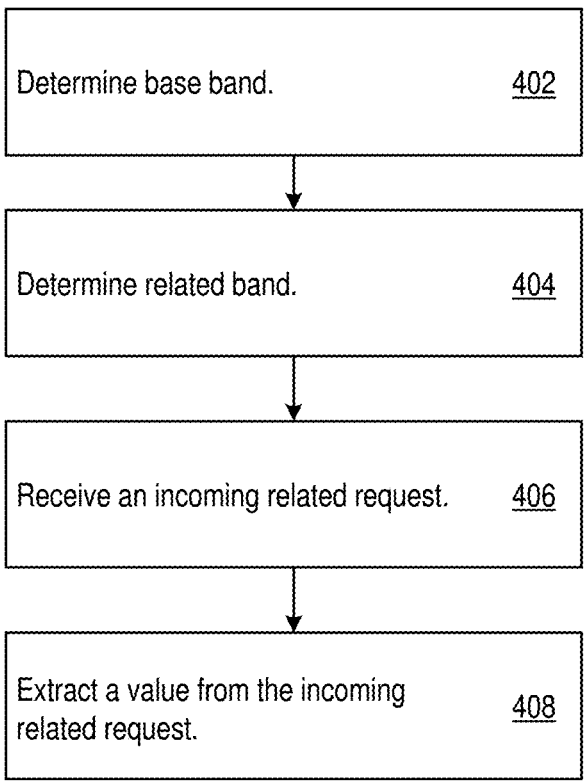
FIG. 2 shows example electrolyzer control logic.

FIG. 2 shows example electrolyzer control logic (ECL) 400 is shown. The ECL 400 may be implemented on circuitry, such as that of the example execution environment 600, discussed below. The ECL 400 may obtain a power source metric indicator (402). The power source metric indicator may include data related to power source characteristics and/or status. For example, as discussed above the power source characteristics may include a forecasted and/or current price of power from one or more sources, status and/or health conditions of power generation sites and/or local systems health, (e.g., such as health/operational system status) for local electrolyzer stacks.

Based on the power source metric indicator, the ECL 400 may determine a hydrogen generation profile for a selected duration (404). Access to the power source metric indicators may allow the ECL 200 to select advantageous times for the generation of hydrogen, e.g., such as when power and/or material input costs are low and/or when revenues from outputs are relatively higher than the input costs. Further, the ECL 200 may monitor site health and operational conditions to allow for distribution of generation load among electrolyzer stacks, sizing of generation loads consistent with electrolyzer system health, and/or other electrolyzer condition based determinations.

The hydrogen generation profile may include a determination of a volume and/or rate for hydrogen generation. Accordingly, the hydrogen generation profile may include an indication of the portion of the capacity of the electrolyzer system and/or the average portion capacity of the electrolyzer system to be placed into service.

The determined duration may include an indication the length of time over which the hydrogen generation profile may control operation of the electrolyzer system. In some cases, a newly determined hydrogen generation profile may be rejected in cases where the duration over which the hydrogen generation profile is too short to justify the indicated changes to operation. For example, a newly determined hydrogen generation profile may indicate that at least a portion of the electrolyzer system should be shut down for a brief period (e.g., less than an hour, less than 30 minutes, less than 10 minutes, less than 1 minute, and/or other period). The ECL 400 may reject the corresponding selected state changes (e.g., transitioning from a standby or active state to an inactive state) due to the brevity of the duration.

The ECL 400 may determine a selected state from among multiple power states for an electrolyzer based on the hydrogen generation profile and a length of the duration (406) where the multiple power states. In various implementations, the multiple power states may include an inactive state, an active state, and/or a standby state, e.g. such as the states and power modes selectable via the state diagram 500 discussed below. Once selected and confirmed as compatible with the length of the duration, the ECL 400 may cause the electrolyzer (or one or more of the electrolyzer stacks therein) to operate in accord with the selected state (408).

Figure 3:
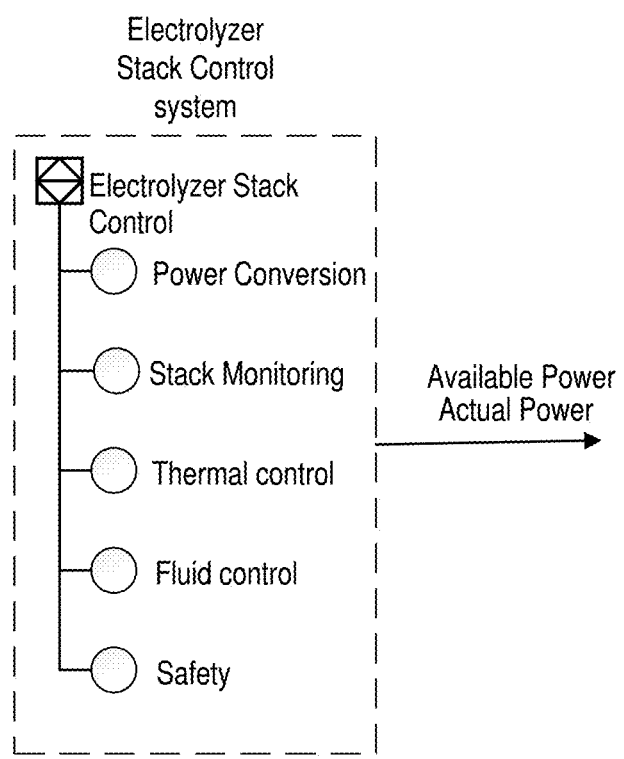
FIG. 3 shows second example electrolyzer control logic.

FIG. 3 shows second example electrolyzer control logic 200, which may be implemented on circuitry. For example, the circuitry may include a hardware processor in data communication with memory including instructions for execution of the logic. Various combinations of hardware and/or software may be used. The subsystems controlled may include power conversation, thermal, fluid and safety of that sub-systems. The electrolyzer stack controller, with the information provided by the sub-system calculated the available power a stack and reports the available power to the site controller.

Figure 4:
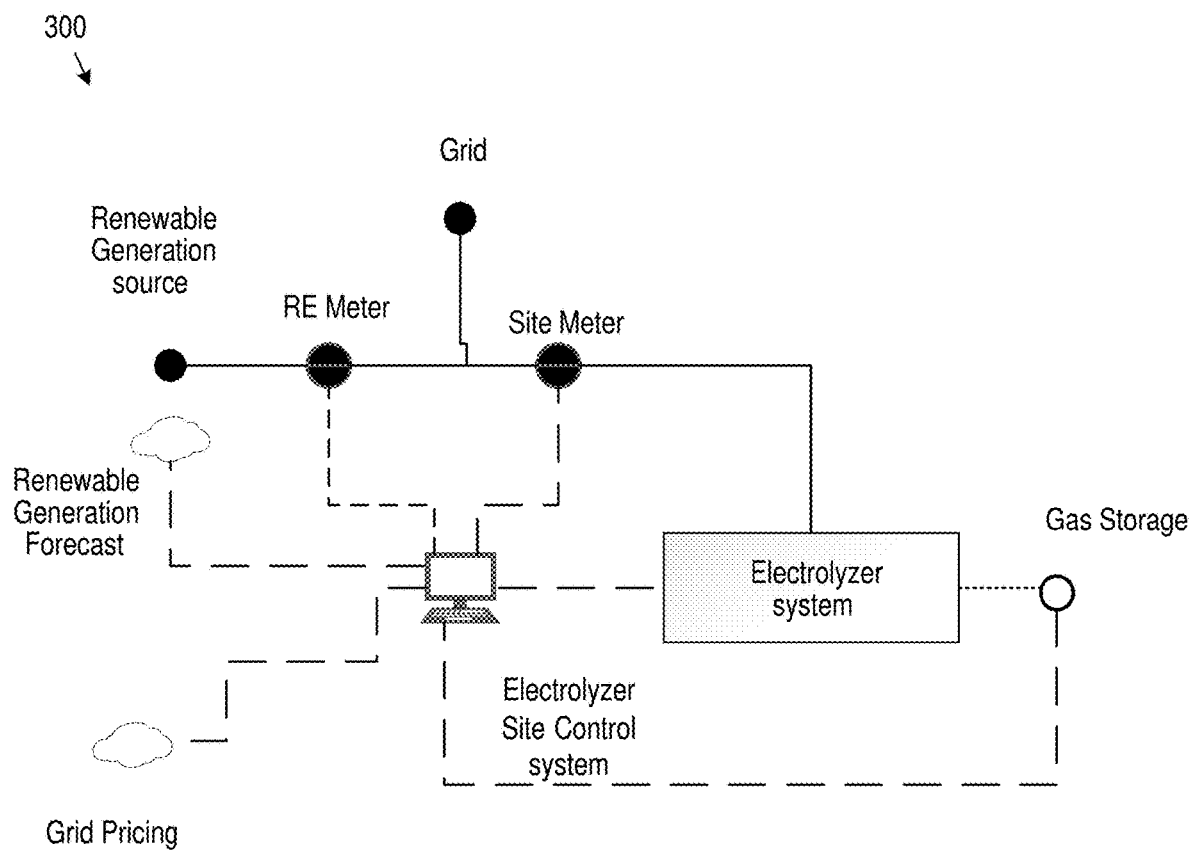
FIG. 4 shows an example electrolyzer system.

FIG. 4 shows an example electrolyzer system 300. FIG. 4 shows example site level power, data, and gas connections to the example electrolyzer system. The power from the renewable generation source flows to both the grid and the electrolyzer system is shown in solid lines. The data connections for electrolysis control system connects the renewable energy meter, the site meter, the renewable generation forecast, and the grid pricing data are shown in dashed lines. The fluid connections to gas storage are shown in dotted line, with the data from each of these systems shown in dashed lines connecting the control system with the fluid system.

Figure 5:
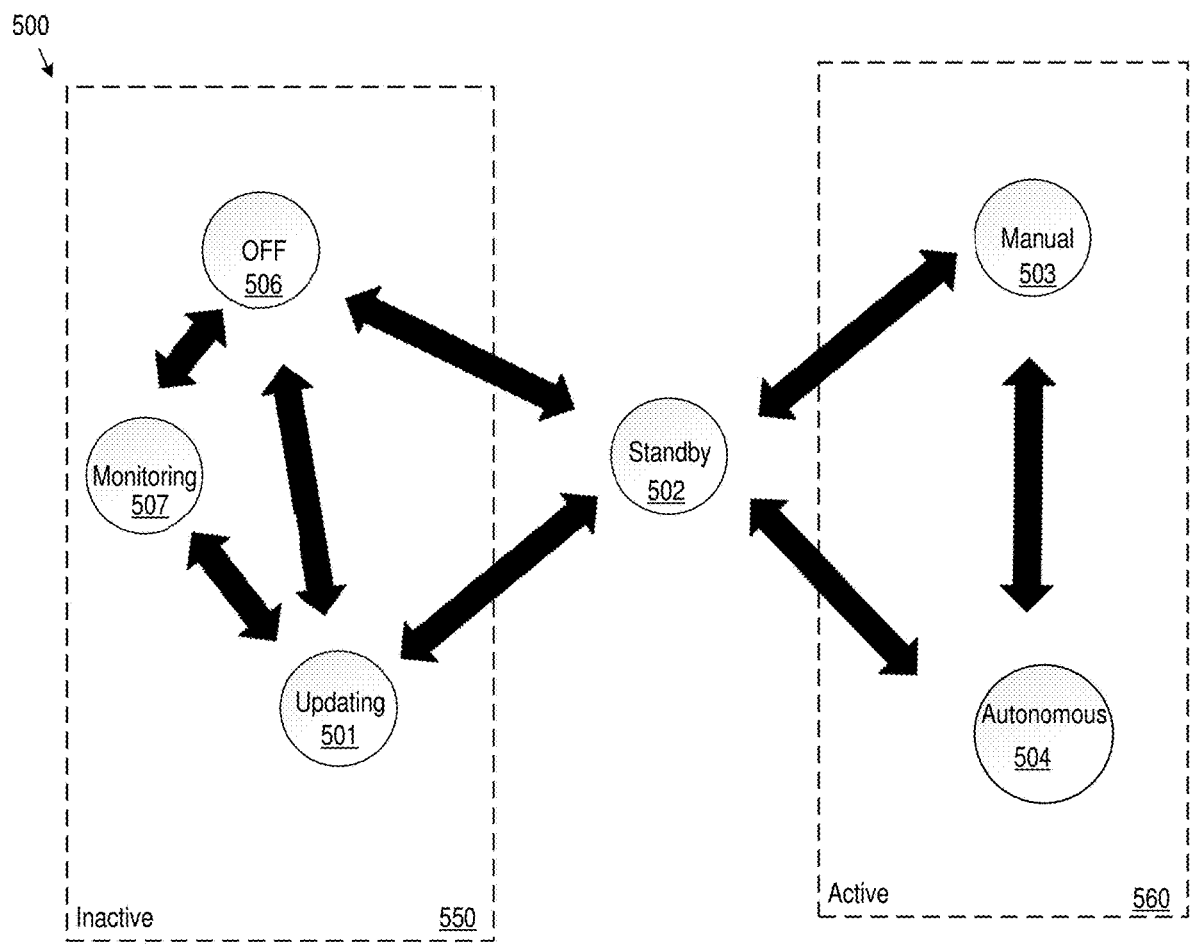
FIG. 5 shows example state-machine logic for electrolyzer control circuitry.

FIG. 5 depicts an example of a state diagram 500 to site control an electrolyzer system, various example states are shown. The state diagram includes standby 502, inactive 550, and active 560 states.

The monitoring mode 507 is a low-power monitoring only mode, typically when auxiliary systems are off-line.

The off mode 506 may include one of a spectrum of low power and full off modes. The off state may be used in conjunction with timings to initiate (temporary) transition to the monitoring state to poll sensors. In some cases, the off state may return to other states as a result of manual commands/interventions. In some cases, the off state (or any of the other inactive states) may include use of battery or other power stores to assist in boot strapping or return to powered states.

The updating mode 501 is where the controller is updating the software one or more components of the system.

The standby state 502 is the standby state where the controller is monitoring. In the standby state auxiliary systems may be energized and ready. In this state, the system can transition to active 560.

The active state 560 may include a manual mode (503), where is the system will respond to manual commands, an autonomous mode (504), where the system will autonomously follow renewable generation with the limits of the grid, forecast, and pricing signals.

In various implementations, the electrolyzer system may switch among the states (e.g., the inactive state 550, the standby state 502, and the active state 560). The interstate transition time may be the minimum time need to transition from one state to another. However, only transitions into or out of the standby state 502 may be completed in accord with the interstate transition time. Transitions from the inactive state 550 to the active state 560 may be characterized by the longer active-inactive transition time. Accordingly, it may be advantageous in some cases to transition into the standby state 502 to ready the electrolyzer system for eventual transition into an unknown one of the active or inactive states. Further, it may be advantageous in some cases to transition into the standby state 502 rather than fully into the inactive state when hydrogen generation is temporarily stopped by will or like will resume in the near future (e.g., within the same hour, same day, or other temporary period). Conversely, it may be advantageous in some cases to transition into the standby state 502 rather than fulling into the active state when hydrogen generation will or like will commence in the near future (e.g., within the same hour, same day, or other temporary period).

In various implementations, the electrolyzer system may switch among the modes within a single state (e.g., the modes within the inactive state of the modes within the active state) in less than the interstate transition time. These power mode transition may not necessarily include on/off changes to the status of electrolyzer stacks. Accordingly, such transitions may be made without the timing concerns related to protecting the health and operation of the electrolyzer stacks.

Figure 6:
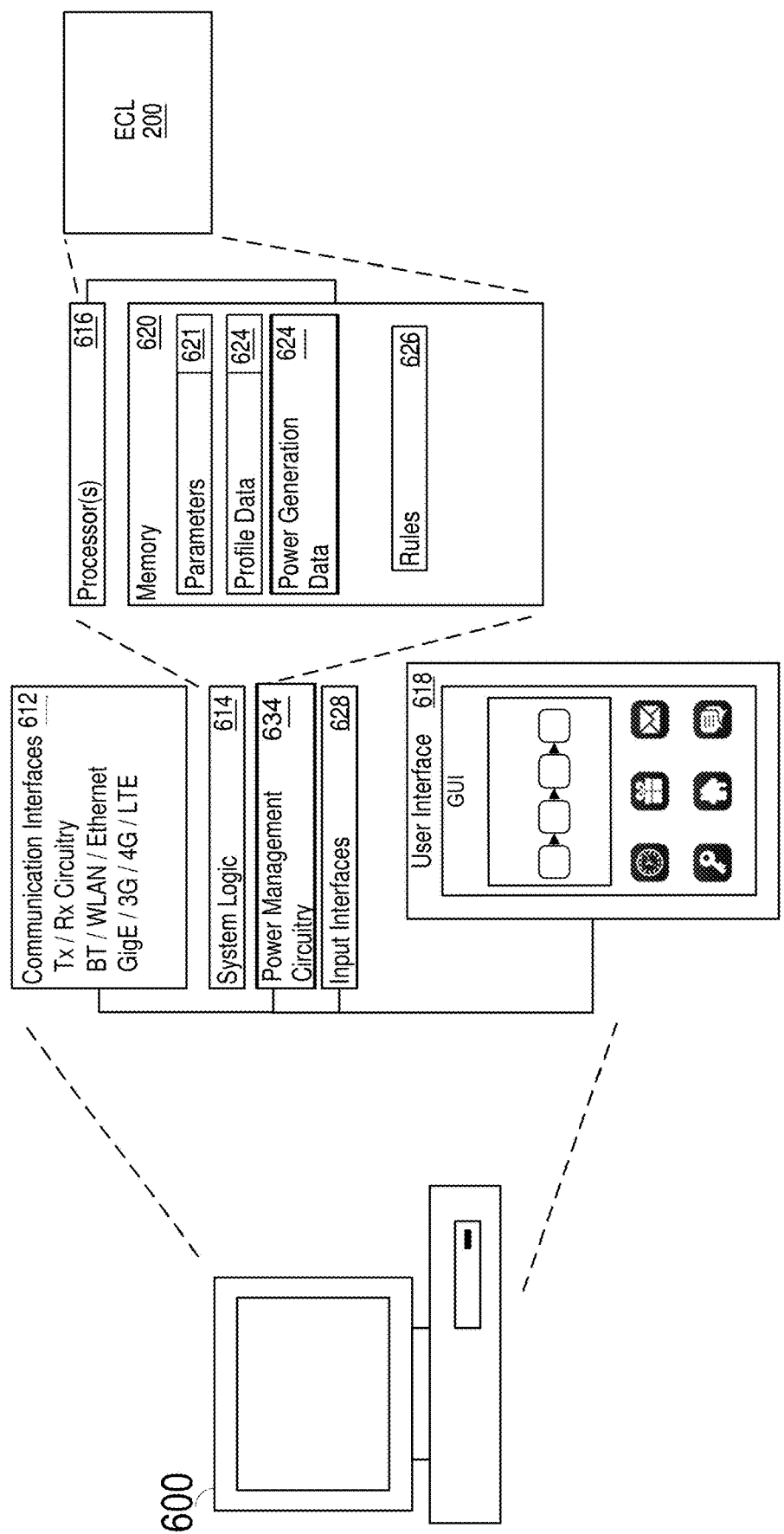
FIG. 6 shows an example execution environment for electrolyzer control logic.

FIG. 6 shows an example execution environment (EE) 600 for implementing the electrolyzer control system described herein. The EE 600 may include system logic 614 to support state selection, hydrogen generation profile creation; duration determination; parameter forecasting; and/or other operations such as those discussed below with respect to the various example implementations. The system logic 614 may include processors 616, memory 620, and/or other circuitry, which may be used to implement the instructions and/or ECL 400.

The memory 620 may be used to store profile data 622 and/or power generation data 624 used or other data. The memory 620 may further store parameters 621, such as pricing information, grid requirements, electrolyzer operational parameters, and/or other parameters that may facilitate profile determination and/or state selection. The memory may further store rules 626, which may support profile determination and/or state selection.

The memory 620 may further include applications and structures, for example, coded objects, templates, or one or more other data structures to support profile determination and/or state selection. The EE 600 may also include one or more communication interfaces 612, which may support wireless, e.g. Bluetooth, Wi-Fi, WLAN, cellular (3G, 4G, LTE/A), and/or wired, ethernet, Gigabit ethernet, optical networking protocols. Additionally, or alternatively, the communication interface 612 may support secure information exchanges, such as secure socket layer (SSL) or public-key encryption-based protocols for sending and receiving data. The EE 600 may include power management circuitry 634 and one or more input interfaces 628.

The EE 600 may also include a user interface 618 that may include man-machine interfaces and/or graphical user interfaces (GUI). The GUI may be used to present prompts for user input of state selection, power generation profile information, hydrogen generation profile information; and/or other user input.

Example Implementations

Electrolyzer Controller with Grid Support

[Autonomous, real-time] The electrolyzer system is operated in a 'generation following' mode by connecting the electrolyzer system to a renewable generation source, such as wind or photovoltaics. The system can be either directly and/or virtually connected to a site controller with power meters. Under normal operating conditions the site controller will set the site power operating setpoint of the electrolyzer system to the generation setpoint, thus consuming the available renewable energy. The power meters are read by the electrolyzer controller at a frequency high enough to follow the generation, approximately 1 Hz, 0.1 Hz, 10 Hz, and/or other frequency.

[Manual, real-time] The electrolyzer system is operated in a generation following mode by reacting to the commands of a local and/or third-party control system.

[Active and passive set-point/feedback] The electrolyzer site controller minimizes the difference between the measured renewable generation and the site load by adjusting the site power operating setpoint.

[max power limit] The site power operating setpoint may be set below the maximum power limit of the electrolyzer system in various ones of the active state power modes.

[ramp from zero] The electrolyzer system is controlled in a manner such that the site power consumed by the electrolyzer system can continuously and smoothly change between effectively zero active power to maximum power. This is achieved by changing the electrolyzer requested set-point of one or more electrolyzer stack controller.

[ramp limit] The site controller electrolyzer system also may constrain the maximum instantaneous change to site power operating setpoint to limit the total ramp-rate.

[frequency] The site controller monitors the frequency of the grid. If the frequency falls outside the control point, then the site controller overrides the site power operating setpoint and changes the site power operating setpoint using a pre-determined control function.

[VAR] The site controller monitors the voltage of the grid and can provided leading or lagging reactive power to the grid if requested or along a pre-determined control function.

Multistate Site Controller with Forecasting

[to zero-power active] The site controller determines when the system should transition from zero-power active or due to a power generation forecast, e.g., for solar and/or wind generation.

For example, the site controller will switch from a low-power standby state to a zero-power on-state ahead of solar generation in the morning so that they system will be immediately ready to start production when the renewable generation reaches a certain level. In the case of solar generation, the solar generation pattern for a given day may be predicted using the weather forecasts, date, and time.

[to standby] In certain examples, the electrolyzer system will transition to a low-power standby state when renewable generation is forecast to be low or zero for a pre-determined time, and but will remain in the active state if the generation is expected to return below that pre-determined times. The integration of forecasting enables a large reduction in the number of transitions that the electrolyzer undergoes, thereby greatly increasing the expected field-life of the electrolyzer. For example, on a partially cloudy day it may be more efficient to ramp down the electrolyzer only partially with each passing cloud, in anticipation of the upcoming gaps between clouds.

Generation Following Controller with Market Signals

[real time] The electrolyzer system is connected to one or more renewable generation sources that can also provide electrical power to the grid. The electrolyzer system reacts to external signals, such as a real-time price, to determine the site power operating setpoint of the electrolyzer system.

[integrated price] The electrolyzer system using the history of power usage and price dynamically changes the price threshold to achieve an average gas generation cost profile. In some cases, contractual agreements, which may include self-executing code-based and/or cryptologic-primitive based smart contracts, may determine price thresholds.

[grid over electrolysis] In certain examples, the electrolyzer system will transition to a low-power state if the renewable generation pricing is higher than a price threshold and will transition to a power-consuming state if the real-time pricing is lower than the price threshold.

[real-time H2 pricing] In certain examples, the price of the output gas (Hydrogen or Oxygen) will determine if the electrolyzer should be generating gas and that gas price will be an external signal to the electrolyzer site controller.

[transition to electrolysis] In certain examples, the renewable generation pricing forecast can be used to prepare the system to transition to zero power active ahead of the price change.

When the electrolysis system is connected to more than one renewable generation source, multiple prices can be used to determine the real-time site power operating setpoint.

Electrolyzer Controller Monitoring and Reporting

[Monitoring point] The electrolyzer stack controller monitors the stack and subsystems in real-time and updates the site controller with available power based on those signals. The available power signal may correspond to the maximum power at which the electrolyzer stack system can accept power given the conditions of the subsystems.

[Available power-Power electronics] The available power is limited by the ability of the power conversion electronics to send usable power to the electrolyzer. The derating of the available power is determined by a pre-determined function for the specific electrolyzer stack technology.

[Available Power-Cooling] The available power can also be limited by the thermal systems ability to cool any of the subsystems.

[Available Power-Fluid] The available power can be limited by the pressure or flows available to or from the stack which can include the state and health of pumps.

[Available Power-Safety] If the electrolyzer system sense an unsafe operation in the system the available power can be derated to zero, and the system can enter a fault condition.

[Available Power-Updating] If the electrolyzer system or one of the sub-systems is updating, the available power can be derated to zero.

[Available Power-Stack Voltage and voltage distribution] The electrolyzer stack derates the available power based on the stack voltage and voltage distribution across the stack.

[Available Power-State of Health] The electrolyzer stack controller maintains a state of health base on gas concentration, voltage at power. Gas concentrations during operation can indicate gas cross-over which can limit the available power.

[State of Health-vibration] The electrolyzer stack controller monitors vibrations from the electrolyzer stack and compares the vibrations frequency and amplitude against a known standard to determine the state of health of the stack.

[Available Power-Cycling count/Age] The electrolyzer stack controller reports the total cycling count and age of the electrolyzer stack to the site controller.

[Control] The electrolyzer controller sets the electrolyzer power and minimizes the difference between the actual power and requested power.

[Actual power] The electrolyzer controller reports the actual power to the site controller.

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be embodied as a signal and/or data stream and/or may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may particularly include a storage medium and instructions stored in or on the medium, and the instructions when executed by the circuitry in a device may cause the device to implement any of the processing described above or illustrated in the drawings.

The implementations may be distributed as circuitry, e.g., hardware, and/or a combination of hardware and software among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Table 1 includes various illustrative examples.

TABLE 1

| Examples |
|---|
| 1. A site controller comprising: |
| a. A CPU connected to a plurality of electrolyzer system; |
| b. A software program to control the system |
| 2. A site controller as in example 1, further comprising: |
| a. A connection to electric meters |
| 3. A site controller as in example 1, further comprising: |
| a. A direct or remote connection to one or more renewable power sources; |
| 4. A site controller as in example 1, further comprising: |
| a. A connection to water pumps and water storage systems; |
| b. A connection to hydrogen pumps and hydrogen storage systems; |
| c. A connection to oxygen pumps and oxygen storage systems |

TABLE 1-continued

Examples

5. A method of operating a computer-implemented state engine for managing a plurality of electrolyzer systems, whose behavior can be modeled by means of a state diagram reacting on external events, the method comprising:
a. An off state with the following characteristics
i. allowing the monitoring of the system;
ii. no power flow to the electrolyzer;
iii. able to transition to the standby or updating state;
b. An updating state with the following characteristics
i. allowing the software of one or more components attached to the system to be updated;
ii. allowing monitoring of the system;
iii. no power flow to the electrolyzers;
iv. able to transition to the off or standby state;
c. A standby state with the following characteristics
i. allowing the systems prepare for operating,
ii. allowing monitoring of the system
iii. no power flow to the electrolyzers;
iv. able to transition to the off, manual, or autonomous state;
d. A manual state, allowing the system to respond to a series of commands from a local or remote source, power flow is possible, and the system is able to transition to the standby or autonomous state;
e. An autonomous state, allowing the systen to autonomously set power flow based on external measurements, and the system is able to transition to the standby or manual state.
6. A method of operating a pluarlity of electrolyzer systems autonomously based on external event and comparing to programmatic setpoint, the method comprising:
a. A renewable generation following command, that set the power set-point based on the total generation of one or more renewable energy system as monitored through power meters;
b. A ramp rate check to determine is the ramp-rate of the electrolyzer is exceeding a threshold;
c. A maximum power check to determine if the maximum power set-point is greater than the maximum power allowed by the system;
7. A method of operating a plurality of electrolyzer systems autonomously based on external grid event and comparing to programmatic setpoint, the method comprising:
a. A frequency window check to determine if the incoming power into the electrolyzer system is within the predetermined frequency window, and adjusting the power set-point based on a function of that measured frequency;
b. A voltage check to determine if leading or lagging VAR should be provided to the grid.
8. A method of operating a plurality of electrolyzer systems autonomously based on forecasted data and comparing to programmatic setpoint, the method comprising:
a. A forecast for the generation provided by the energy source and putting the system into a state to use the forecasted energy at the time of arrival
b. An hour ahead forecast in price of the energy source;
E1: A system including:
an electrolyzer;
a multiple-state power input coupled to the electrolyzer; and
control circuitry,
where the multiple-state power input is configured to switch between multiple power states for the electrolyzer including:
an inactive state;
an active state; and
a standby state characterized by an operational power level allowing transition to either the inactive state or the active state without transition to an intermediate state; and
where the control circuitry is configured to:
receive a power source metric indicator;
determine a hydrogen generation profile for a duration based on the power source metric indicator;
determine a selected state from among the multiple power states based on the hydrogen generation profile and a length of the duration; and
send control signaling to cause operation of the multiple-state power input at the selected state.
E2. The system of any of the other examples in this table, where the inactive state and active state are characterized by an active-inactive transition time, the active-inactive transition time including a minimum time for the electrolyzer to remain in the standby state when transitioning between the inactive state and active state.

TABLE 1-continued

Examples

E3. The system of example E2 or any of the other examples in this table,
where the control signaling is configured to cause the electrolyzer to:
revert to the inactive state from the standby state in less than the transition
time; or revert to the active state in less than the transition time.
E4. The system of any of the other examples in this table, where a transition
between any two different states of the multiple power states is characterized
by an interstate transition time, where the transition between any two
different states lasts at least long as the interstate transition time.
E5. The system of example E4 or any of the other examples in this table where:
optionally, the control circuitry in configured to reject a transition between the
inactive state and the active state when the duration is below the active-inactive
transition time; and
optionally, the control circuitry is configured to reject any transition between
different states when the duration is below the interstate transition time.
E6. The system of any of the other examples in this table, where the active
state includes one or more power operation modes, where:
optionally, the one or more power operation modes include:
a zero-power active mode;
a nominal power active mode;
an autonomous mode; and/or
a manual mode;
optionally, the zero-power active mode includes operating the elctrolyzer in
the active state without hydrogen generation;
optionally, the nominal power active mode includes operating the electrolyzer
in the active state with at least a nominal level of hydrogen generation;
optionally, the nominal level of hydrogen generation includes a hydrogen
generation level that exceeds a defined turn-on threshold for production;
optionally, the autonomous mode includes automatic adjustment of the
electrolyzer active state power consumption based on the power source
metric indicator; and optionally, the manual mode includes operation based on
one or more operator commands or third-party control system commands to
adjust an electrolyzer operating setpoint (e.g., real-time or near-real-time
operator control).
E7. The system of example E6 or any of the other examples in this table, where
the electrolyzer is configured to switch between the one or more
power operation modes in less than the interstate transition time.
E8. The system of any of the other examples in this table, where the power
source metric indicator includes:
optionally, a cost for power;
optioanlly, a proportion of renewable energy in a power source make-up;
optionally, an indicator of electrolyzer health;
optionally, an indication for the production status of a specific power generation
plant; and
optionally, a cost for hydrogen and/or oxygen, and
where optionally, the power source metric indicator includes a forecasted power
source metric indicator.
E9. The system of any of the other examples in this table,
where the inactive state includes one or more depowered modes, and
where optionally, the one or more depowered modes include:
a monitoring mode, where the control circuitry is powered for monitoring status,
monitoring power source metric indicators, monitoring electrolyzer status,
and/or other monitoring while one or more electrolyzer stacks are powered off;
a full-off state where control circuitry and one or more electrolyzer stacks are
powered off; and/or
an update state, e.g., where the control circuitry is powered to perform
updates, and in some cases, perform monitoring while one or more
electrolyzer stacks are powered off.
E10. The system of any of the other examples in this table, where the control
circuitry is configured to control the output of a power generator in accord with
the power source metric indicator, where:
optionally, the electrolyzer is configured to receive the output (at least in part,
and in some cases the full output);
optionally, the power generator is a renewable power source generator;
optionally, the power generator is co-located with the electrolyzer;
optionally, the power generator is coupled to the electrolyzer via a power grid
(e.g., a grid operated by a power utility or other power grid); and
optionally, the system further includes sensors to determine power generation
conditions (which may serve as the power source metric indicator) to determine
the output, where:
optionally, the sensors are polled periodically, e.g., at 1 Hz or other frequency
to coordinate the consumption by the electrolyzer with the output from the
power generator.
E11. The system of any of the other examples in this table, where
the electrolyzer includes multiple elctrolyzer stacks, where:
optionally, individual electrolyzer stacks may be controlled individually;
optionally, sub-groups of electrolyzer stacks may be controlled as a sub-group;
optionally, the health of one or more of the multiple electrolyzer stacks may be
used, at least in part, to determine the power source metric indicator;

TABLE 1-continued

Examples optionally, the health of one or more of the multiple electrolyzer stacks may be
used to determine which electrolyzer stacks may be used and/or an order for use;
optionally, the control circuitry is configured to distribute, rotate, and/or
randomize the usage of the multiple electrolyzer stacks.
E12. A method including implementing the system of any of the other examples
in this table.
E13. A method including:
receiving and/or determining a power source metric indicator;
determining a hydrogen generation profile for a duration based on the power
source metric indicator;
determining a selected state from among multiple power states for
an electrolyzer based on the hydrogen generation profile and a lengh of the
duration, where the multiple power states including:
an inactive state;
an active state; and
a standby state characterized by an operational power level allowing transition
to either the inactive state or the active state without transition to an
intermediate state; and
causing operation of the electrolyzer in the selected state
from among the multiple power states, where:
optionally, the method is implemented using a system (optionally, the
system is in accord with any of the other examples in this table).
E15. A method including selecting a power state for an electrolyzer based on
one or more power source metric indicators, the method optionally including
implementing any feature or combination of features in the disclosure.
E16. A system including circuitry configured to select a power state for an
electrolyzer based on one or more power source metric indicators, the system
optionally including any feature or combination of features in the disclosure.
E17. A method of fabricating and/or manufacturing, at least in part,
the system of any of the other examples in this table.

Various example implementations have been included for illustration. Other implementations are possible.

The present disclosure has been described with reference to specific examples that are intended to be illustrative only and not to be limiting of the disclosure. Changes, additions and/or deletions may be made to the examples without departing from the spirit and scope of the disclosure.

The foregoing description is given for clearness of understanding only, and no unnecessary limitations should be understood therefrom.

What is claimed is:

1. A system including:
an electrolyzer;
a multiple-state power input coupled to the electrolyzer; and
control circuitry,
where the multiple-state power input is configured to switch between multiple power states for the electrolyzer including:
an inactive state;
an active state; and
a standby state characterized by an operational power level allowing transition to either the inactive state or the active state without transition to an intermediate state, wherein switching between the inactive state and the active state is characterized by an active-inactive transition time, and wherein the active-inactive transition time comprises a minimum time for the electrolyzer to remain in the standby state when switching between the inactive state and the active state; and
where the control circuitry is configured to:
obtain a power source metric indicator;
determine a hydrogen generation profile for a duration based on the power source metric indicator;
determine a selected state from among the multiple power states based on the hydrogen generation profile and a length of the duration; and
send control signaling to cause operation of the multiple-state power input at the selected state.

2. The system of claim 1, where the control circuitry is further configured to cause the electrolyzer to:
revert to the inactive state from the standby state in less than the active-inactive transition time; and
revert to the active state from the standby state in less than the active-inactive transition time.

3. The system of claim 1, where a transition between any two different states of the multiple power states is characterized by an interstate transition time, where the transition between any two different states lasts at least as long as the interstate transition time.

4. The system of claim 3, where:
the control circuitry is configured to reject a transition to the selected state:
at a time that the transition to the selected state includes the transition between the inactive state and the active state and the duration is below the active-inactive transition time; and
at a time that the transition to the selected state includes the transition between any two different states and the duration is below the interstate transition time.

5. The system of claim 3, where the active state includes one or more power operation modes, the one or more power operation modes including:
a zero-power active mode;
a nominal power active mode;
an autonomous mode; and/or
a manual mode.

6. The system of claim 5, where the electrolyzer is configured to switch between two of the one or more power operation modes in less than the interstate transition time.

7. The system of claim 1, where the power source metric indicator includes a forecasted power source metric indicator.

8. The system of claim 1, where the inactive state includes one or more depowered modes, the one or more depowered modes including:
a monitoring mode;
a full-off mode; and/or
an update mode.

9. The system of claim 1, where the control circuitry is configured to control an output of a power generator based on the power source metric indicator.

10. The system of claim 1, where the electrolyzer includes multiple electrolyzer stacks, where the control circuitry is configured to control a sub-group of the multiple electrolyzer stacks in parallel as a sub-group.

11. The system of claim 1, where the electrolyzer includes multiple electrolyzer stacks, where the control circuitry is configured to determine an activation order for the multiple electrolyzer stacks based on an operational condition of one or more of the multiple electrolyzer stacks.

12. A method for hydrogen production comprising:
obtaining, by control circuitry of a system, a power source metric indicator;
determining, by the control circuitry, a hydrogen generation profile for a duration based on the power source metric indicator;
determining, by the control circuitry, a selected state from among multiple power states for an electrolyzer based on the hydrogen generation profile and a length of the duration, where the multiple power states comprise:
an inactive state;
an active state; and
a standby state characterized by an operational power level allowing transition to either the inactive state or the active state without transition to an intermediate state, wherein switching between the inactive state and the active state is characterized by an active-inactive transition time, and wherein the active-inactive transition time comprises a minimum time for the electrolyzer to remain in the standby state when switching between the inactive state and the active state; and
sending, by the control circuitry, a signal to a multiple-state power input coupled to the electrolyzer to cause operation of the electrolyzer in the selected state from among the multiple power states, wherein the multiple-state power input switches between the multiple power states for the electrolyzer.

13. The method of claim 12, further including reverting to the active state from the standby state in less than the active-inactive transition time.

14. The method of claim 12, where a transition between any two different states of the multiple power states is characterized by an interstate transition time, where the transition between any two different states lasts at least as long as the interstate transition time.

15. The method of claim 14, further including rejecting a transition to the selected state:
at a time that the transition to the selected state includes the transition between the inactive state and the active state and the duration is below the active-inactive transition time; and/or
at a time that the transition to the selected state includes the transition between any two different states and the duration is below the interstate transition time.

16. The method of claim 14, where the active state includes one or more power operation modes, the one or more power operation modes including:
a zero-power active mode;
a nominal power active mode;
an autonomous mode; and/or
a manual mode.

17. The method of claim 16, further including switching between two of the one or more power operation modes in less than the interstate transition time.

18. A product including:
machine-readable media other than a transitory signal; and
instruction stored on the machine-readable media, the instructions, when executed, configured to cause control circuitry to:
obtain a power source metric indicator;
determine a hydrogen generation profile for a duration based on the power source metric indicator;
determine a selected state from among multiple power states for an electrolyzer based on the hydrogen generation profile and a length of the duration, where the multiple power states comprise:
an inactive state;
an active state; and
a standby state characterized by an operational power level allowing transition to either the inactive state or the active state without transition to an intermediate state, wherein switching between the inactive state and the active state is characterized by an active-inactive transition time, and wherein the active-inactive transition time comprises a minimum time for the electrolyzer to remain in the standby state when switching between the inactive state and the active state; and
send a signal to a multiple-state power input coupled to the electrolyzer to cause operation of the electrolyzer in the selected state from among the multiple power states, wherein the multiple-state power input switches between the multiple power states for the electrolyzer.

* * * * *